(No Model.)
F. F. WOLGAMUTH.
POTATO PLANTER.
No. 539,243. Patented May 14, 1895.
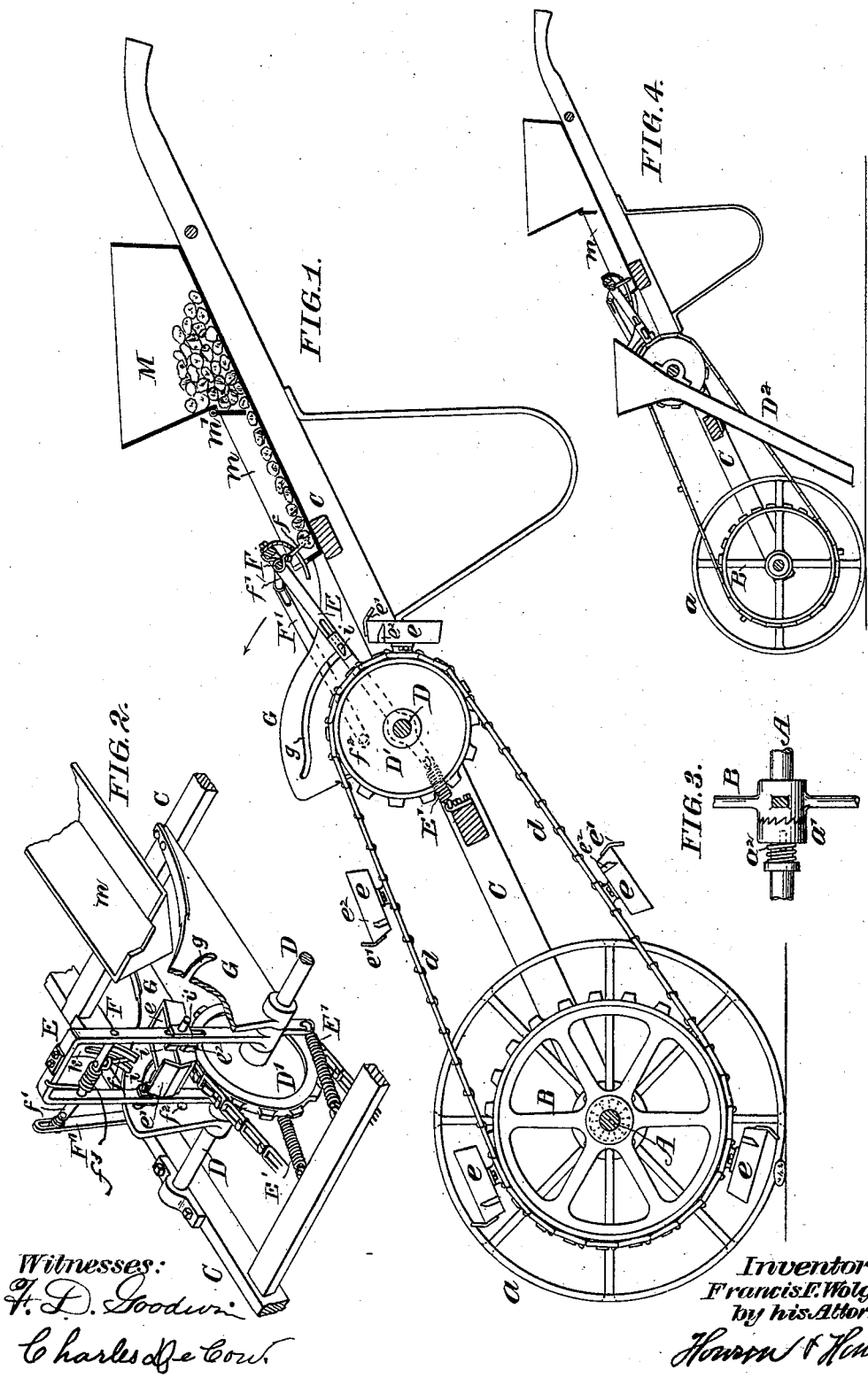
Witnesses:
Inventor:
Francis F. Wolgamuth
by his Attorneys

UNITED STATES PATENT OFFICE.

FRANCIS F. WOLGAMUTH, OF PHILADELPHIA, PENNSYLVANIA.

POTATO-PLANTER.

SPECIFICATION forming part of Letters Patent No. 539,243, dated May 14, 1895.

Application filed December 27, 1894. Serial No. 533,100. (No model.)

*To all whom it may concern:*

Be it known that I, FRANCIS F. WOLGAMUTH, a citizen of the United States, residing in Philadelphia, Pennsylvania, have invented certain Improvements in Potato-Planters, of which the following is a specification.

The object of my invention is to construct a hand machine for planting potatoes, which will be inexpensive and which will automatically pick a potato set from a hopper and discharge it into the furrow, as fully described hereinafter.

In the accompanying drawings, Figure 1 is a sectional view of my improved potato-planting machine. Fig. 2 is a perspective view of the upper portion of the machine. Fig. 3 is a detached view showing the clutch by which one or both wheels are geared to the axle. Fig. 4 is a view of a modification of my invention.

A is the axle to which are secured, in the present instance, two wheels $a\ a$. On the axle is a clutch sleeve $a'$ having teeth which engage with teeth on the hub of the sprocket wheel B. A spring $a^2$ tends to keep the sleeve in gear with the sprocket wheel and the teeth are so set that the wheel will be driven forward when the machine is pushed forward but will not be driven when the machine is reversed.

Swiveled to the axle A is a frame C consisting of the two side bars and cross bars. Mounted on said frame are bearings for the shaft D on which is a sprocket wheel $D'$ and passing around the sprocket wheels B and $D'$ is a chain $d$, carrying receptacles or pans $e$ for the potato sets. The pans have lips $e'$ extending at the front and slightly inclined so as to prevent the potato sets falling out of the pans before they reach a point near the ground, preventing the scattering of the sets in the furrow.

Hinged to the shaft D is an arm E, yoked in the present instance, and extending across the arm is a small shaft F having a pin $f$ for engaging the potato set. This shaft F has an arm $f'$ connected to a link $F'$, pivoted at $f^2$ to a frame G mounted on the frame C and shaft D. A spring $f^3$ on the small shaft F tends to keep the pin $f$ at right angles to the arm E and in proper position to engage with a set in the hopper.

On the arm E are blocks $i$ with which lugs $e^2$ on the pans $e$ engage. These blocks $i$ slide on the arm E and have projections $i'$ which rest in ways $g$ in the plates G. These ways are concentric with the wheel $D'$ except at one point, at the end where the blocks are drawn up clear of the lugs on the pans $e$. A spring or springs $E'$ return the arm to its normal position, as shown in Fig. 1.

Projecting from the arm E is a forked plate $k$ through which the pin $f$ passes so that when the pin is moved to the position shown in Fig. 2, the plate $k$ forces the potato set from the pin into a pan.

M is the hopper having a spout $m$ into which the sets are fed, preferably in a single row so that the leading set will be engaged by the pin $f$. A valve or gate $m'$ regulates the feed from the hopper to the spout.

In Fig. 4, I have shown a tube $D^2$ as a substitute for the conveyer chain and pans $e$. In this instance a drive chain may be used having lugs which engage with the feeding device. The pin carries the potato set from the spout $m$ to the mouth of the tube. It is then released from the pin and passes through the tube to the furrow.

The operation of the machine is as follows: The furrow is made by a plow (not shown) and the hopper M is filled with potato sets properly cut and some of the potato sets pass into the trough $m$. The machine is grasped by the handles and pushed forward in the furrow and as it is moved forward motion is imparted to the chain $d$ having the receptacle $e$, and as the receptacle turns around the wheel $D'$ its lugs $e^2$ come in contact with the lug or lugs $i$ on the arm E having the pin, carrying the arm forward in the direction of the arrow, Fig. 1. As the arm moves forward the pin is turned on its pivot and the potato is drawn off the pin by the forked plate $k$ and falls into the pan which is now directly under the pin and as the pin moves forward the lug on the sliding block is raised by the cam slide in the plate G so as to clear the lug $e^2$ on the pan. The potato set is then carried by the pan down to the furrow and the potato is prevented from falling out of the pan by the lip and when the pan is nearly inverted the potato falls into the furrow. In the meantime as soon as the arm carrying the pin is released it is drawn back by its spring E' and engages with another potato set ready for the next pan. Thus the potatoes are set in a furrow at the proper distance apart. The distance however, can be regulated by the placing of pins upon the chain as more or less links can be used in the chain and the number of pans can be varied.

Although I have described two traction wheels it will be understood that one traction wheel may be used if more convenient and it will also be understood that the lugs $e^2$ may be on the chain $d$ instead of on the pans $e$.

I claim as my invention—

1. The combination in a potato planter, of the pivoted arm, a pin carried thereby and having a movement independent of the arm, a hopper and a conveyer, with mechanism for operating the arm so that the pin will transfer a potato set from the hopper to the conveyer, substantially as described.

2. The combination of the traction wheel, its shaft, a sprocket wheel thereon, a shaft D also having a sprocket wheel, a chain or belt passing around said sprocket wheels, a pivoted arm, a conveyer, a pin carried by said arm, said pin having a movement independent of the arm, a hopper and mechanism for operating the pin so that it will engage a potato set in the hopper and transfer it to the conveyer, lugs on the chain for actuating the arm, substantially as described.

3. The combination of a handled frame, the shaft, traction wheel, sprocket wheel on the shaft, a shaft D mounted on the frame and having a sprocket wheel, a belt passing around the said sprocket wheels, pans on the said belt and lugs, with a hopper, an arm pivoted to the shaft D, a pin carried by the arm having a movement independent of the arm, said arm having a projection adapted to be struck by the lugs on the belt so that the pin will carry a potato set from the hopper and discharge it into one of the pans, substantially as described.

4. The combination of the frame, the shaft, traction wheel thereon, a sprocket wheel also on the shaft, a shaft D, a sprocket wheel thereon, a chain belt passing around the two sprocket wheels, pans on the said belt adapted to receive the potato sets and discharge them into a furrow, the hopper having a trough, a pivoted arm on the shaft D, a shaft carried by said arm having a pin adapted to engage with a potato set, a crank on said shaft, a link connected to said crank, a forked plate through which the pin passes, a lug on each pan adapted to engage with the pivoted arm so that a potato set will be carried by the pin from the hopper and discharged into the pan, substantially as described.

5. The combination of a frame, the shaft, traction wheel and sprocket wheel thereon, the shaft D carried by the frame, its sprocket wheel, chain belt passing around the sprocket wheels, pans on said belt, a hopper, an arm pivoted on the shaft, a block on the arm, a plate having the cam slot engaging with the block, lugs on the pans also engaging with the block, a shaft carried by the arm having a pin adapted to engage with the potato set, a crank on said shaft, a link connected to said crank and pivoted to the fixed portion of the machine, a spring for returning the pin to its normal position, and a spring for returning the arm to its normal position when released from control of the lug on the pan, substantially as described.

6. The combination in a potato planter, of the traction wheel, its shaft, sprocket wheel on said shaft, a sprocket wheel D, belt wheels on said shaft, and a belt wheel D, pans on said belt wheel for the reception of the potato seed, each pan having an extension at the forward end to prevent the discharge of the potato set before the pan reaches a certain position, substantially as described.

In testimony whereof I have signed my name to this specification in the presence of two subscribing witnesses.

FRANCIS F. WOLGAMUTH.

Witnesses:
HENRY HOWSON,
JOSEPH H. KLEIN.